July 29, 1947.  J. N. M. HOWELLS  2,424,890
TAX CALCULATOR
Filed Aug. 14, 1943  3 Sheets—Sheet 1

INVENTOR.
JOHN N. M. HOWELLS
BY
ATTORNEY

Fig-3

July 29, 1947.  J. N. M. HOWELLS  2,424,890
TAX CALCULATOR
Filed Aug. 14, 1943  3 Sheets-Sheet 3

Fig. 3A

INVENTOR.
JOHN N. M. HOWELLS
BY
ATTORNEY

Patented July 29, 1947

2,424,890

UNITED STATES PATENT OFFICE 2,424,890

TAX CALCULATOR

John N. M. Howells, Kittery, Maine

Application August 14, 1943, Serial No. 498,617

14 Claims. (Cl. 235—78)

This invention relates to calculators for computing taxes such as the "pay-as-you-go" and "victory" weekly withholding taxes.

Under the provisions of the current Tax Payment Act of 1943 pertaining to the collection of income tax at source on wages, all employers are required to deduct and withhold a "pay-as-you-go" tax upon the wages of their employees. This tax is in the amount of 20% of the excess of each wage payment over a withholding exemption determined by the family status of the employee.

The weekly computation of said tax for large payrolls and for payrolls where the wages are in odd amounts, resulting, for example, from the payment of wages on a piece or hourly basis, has proven to be an onerous task. Accordingly, it is a primary object of the present invention to provide a calculator whereby determination of the foregoing or a like tax is facilitated.

Another object of the invention is to provide a calculator in which only the number of dollars of a wage need be set and on which the tax can be read opposite the number of cents of a wage.

The Tax Payment Act of 1943 further provides that in no event shall the tax withheld be less than 3% of the excess of the wages, computed on a weekly basis, over an exemption of $12.00 a week. This 3% minimum tax, popularly known as the "victory" tax requires duplicate computations in many instances. It is, therefore, a further object of the invention to provide a calculator of the character described which, every time that the "pay-as-you-go" tax is computed, will simultaneously, and without additional manipulation, compute the "victory" or a like tax so that the two taxes can be visually compared to determine which is greater. Other objects of the invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawings, in which is shown one of the various possible embodiments of this invention.

Referring now in detail to the drawings, 10 denotes a calculator embodying the invention and comprising a stationary base 12, a lower disc 14, hereinafter referred to as disc No. 1, another disc 16, hereinafter referred to as disc No. 2 which is disposed immediately above disc No. 1, a third disc 18, hereinafter referred to as disc No. 3, which is disposed immediately above disc No. 2, and a top disc 20 hereinafter referred to as disc No. 4. The several discs or slides are substantially circular in outline, except as hereinafter noted, and are concentrically arranged and centrally apertured to admit a common pivot member 22 relative to which all of the discs are rotatable and which also serves to hold the elements of the calculator in assembled relationship.

The discs may be made of a material such as cardboard, sheet metal or plastic capable of holding its shape and able to carry suitable indicia, which can be provided in any manner well known to the art, as for example by printing, impressing, or molding.

Means may be employed to hold disc No. 4 against rotation relative to the base 12. Such means is preferably so constructed and arranged or made of such materials that it will not obscure any of the indicia on the discs, and to this end said means may comprise a strip 24 of a clear translucent material such as copolymerized vinyl chloride and vinyl acetate, one surface of which is coated adjacent both its ends with adhesive. These ends are pressed against the top faces of disc No. 4 and the base 12. The portion of said strip 24 bridging the space from the periphery of disc No. 4 to the periphery of disc No. 1 is non-adhesive so that it will not interfere with free relative rotation of the discs.

Figure 1:
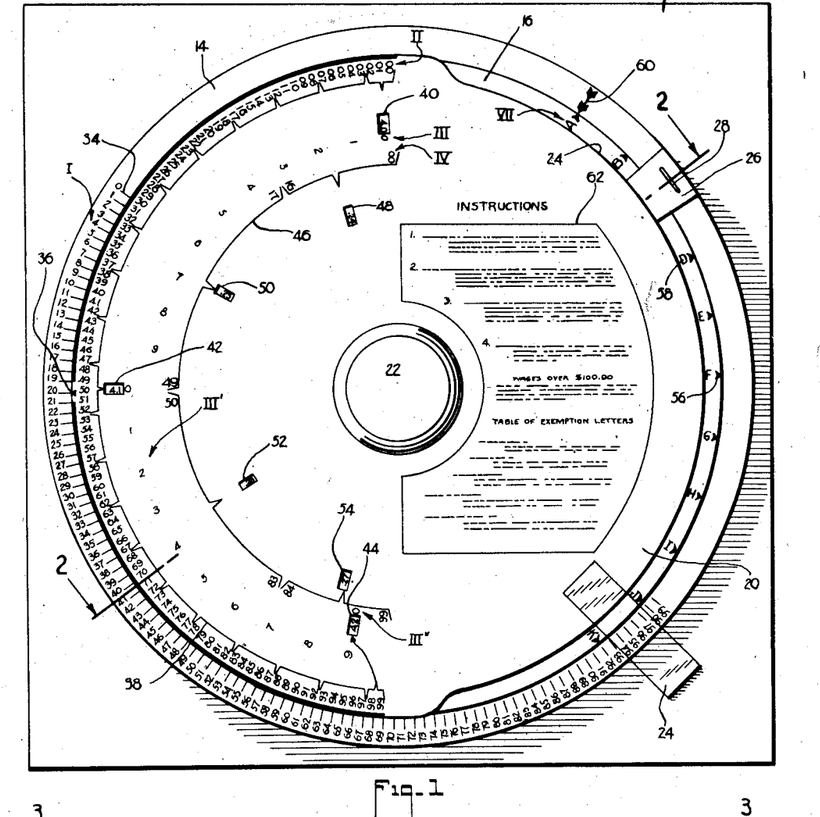
Fig. 1 is a top plan view of a calculator constructed in accordance with the invention.
Figure 2:
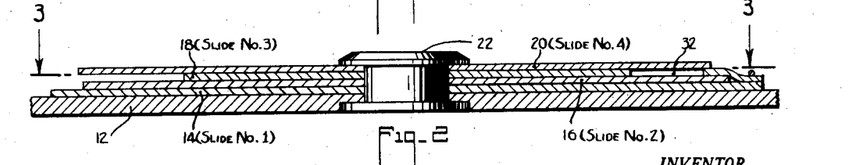
Fig. 2 is a sectional view therethrough taken substantially along the line 2—2 of Fig. 1.
Figure 3:
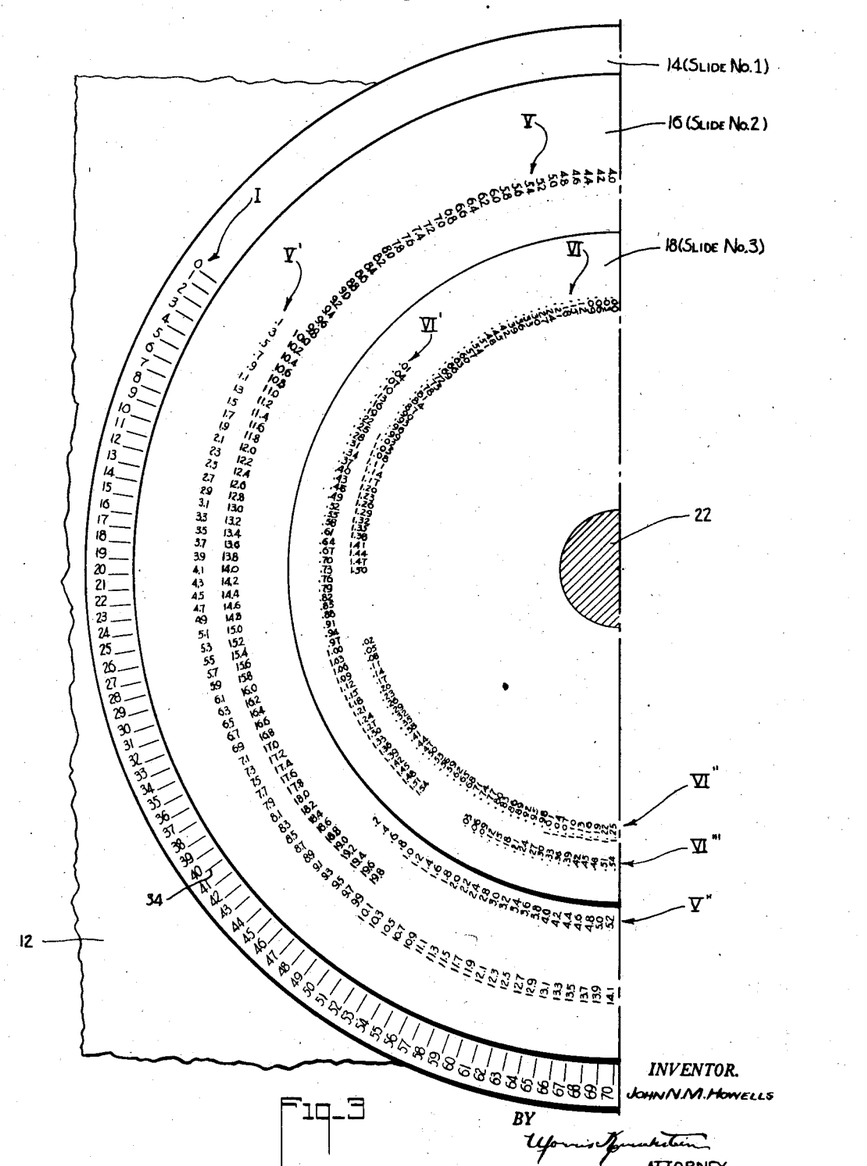
Figs. 3 and 3A, placed together at the dot and dash lines, form an enlarged sectional view taken substantially along the line 3—3 of Fig. 2.
Figure 3A:
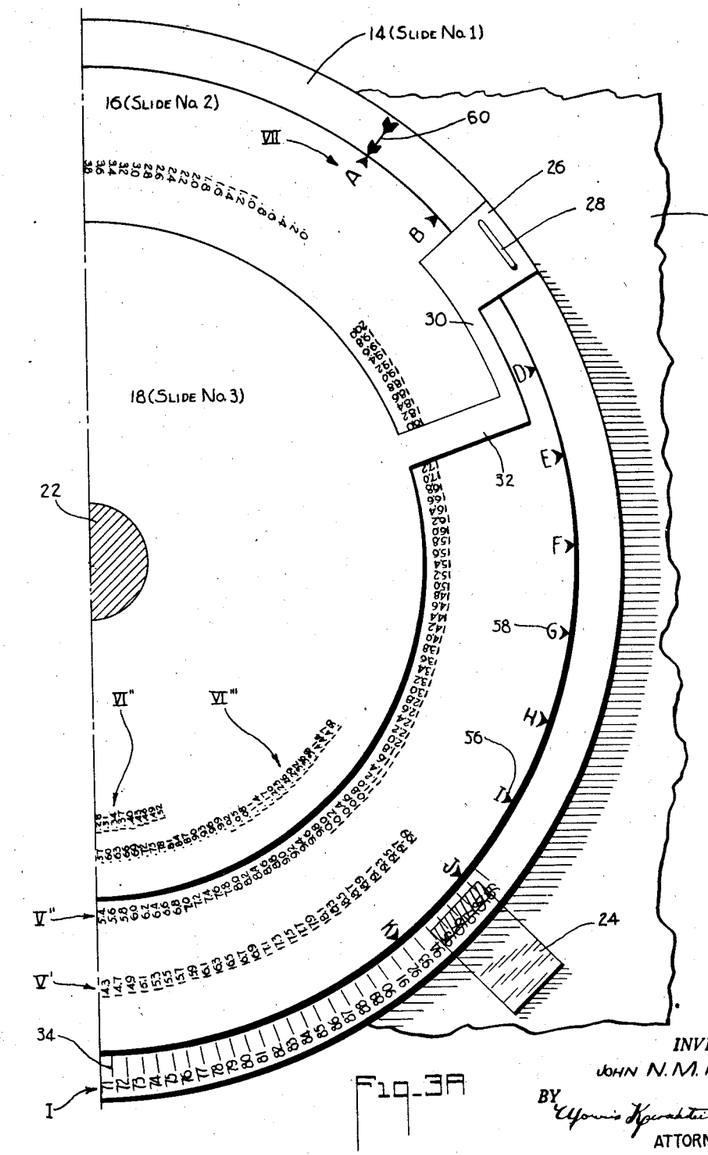

Disc Nos. 1, 2, and 3 are successively smaller in diameter, as clearly shown in Figs. 2, 3, and 3A, while disc No. 4 has a diameter equal to or greater than the diameter of disc No. 2 but smaller than the diameter of disc No. 1 so that when the discs are coaxially arranged the rim of disc No. 1 is visible. In addition, disc No. 4 has a substantial indented peripheral portion 24 which exposes a segment of the rim of disc No. 2. The function of all these contours will later appear.

As will hereinafter be seen, discs No. 1 and 3 carry scales, later described as scales I, VI, VI', VI" and VI''', which must be maintained in fixed predetermined relationship. This may be accomplished by providing a projecting finger 26 on disc No. 3 which extends over disc No. 2 and is connected by a securing member, such as a staple 28, to the exposed rim of disc No. 1.

To facilitate manipulation of the calculator, it is desirable to have disc Nos. 1, 2, and 3 rotate together when any one of these discs is turned, although disc No. 2 must be permitted to rotate relative to disc Nos. 1 and 3. To this end the finger 26 may have a portion intermediate the staple 28 and rim of disc No. 3 in frictional contact with disc No. 2. The friction thus created is relatively slight and can be easily overcome when it is desired to independently rotate disc No. 2.

However, it is sufficient to cause disc Nos. 1, 2, and 3 to jointly rotate when any one of them is turned without holding another. This frictional contact may be enhanced by forming the finger 26 in such manner as to increase the area of contact. Thus the finger 26 may include an arcuate portion 30 which is in light frictional contact with the underlying rim portion of disc No. 2. Said arcuate portion is connected to the rim of disc No. 3 by a radial portion 32 which maintains the arcuate portion spaced away from disc No. 3 a distance sufficient to clear scales V, V', and V'', hereinafter described, on disc No. 2. A few indicia of these scales will be blocked out by the radial portion 32, which is, therefore, so arranged in relationship to the indicia on said scales and to means soon to be described on disc No. 1 for reading such indicia that any indicia blocked out are remote from points where readings are being taken.

The exposed rim of disc No. 1 is provided with an arcuate scale I, which may occupy a substantial portion of the periphery of said disc, in the illustrated example approximately 180°. This scale constitutes all the whole numbers from 0 through 99 serially arranged with a graduation 34 for each number. More whole numbers may be included, if desired, but I have found that larger wages, i. e. over $100.00, may be more conveniently handled by computing on the calculator the tax over even multiples of $100.00 or less and adding thereto the mentally computable tax on the remander of the wage. This procedure enables scale I to embrace but few numbers thus inducing ease of computation and the use of large and legible numbers. The graduations as well as the numbers are arranged at equal intervals around the exposed rim of disc No. 1 and read in dollars of a wage earned. Scale I is read in conjunction with a symbol such as the pointer 36 at the periphery of slide No. 4.

Disc No. 4 carries an arcuate scale II adjacent its periphery. This scale also consists of all the whole numbers from 0 through 99 serially arranged. These numbers are arranged at the same angular intervals as the numbers in scale I and read in cents of a wage earned. The numbers in scale II are grouped in sets by a series of brackets 38. These brackets group the first three numbers, to wit, 00, 01, and 02, and after that each set of five numbers, for example, 03, 04, 05, 06, and 07, the last two numbers, 98 and 99, being separately grouped. The grouping defined by the brackets is such that the tax for a given tax rate, in this instance 20%, will be the same for all the numbers of pennies in each bracket, mills less than five being disregarded and from five up treated as an additional penny. The tax on adjacent brackets differs by a penny.

Each bracket is permanently associated with a different number in one of scales III, III', and III'' on disc No. 4, said numbers representing the last or penny digit of the "pay-as-you-go" tax for wages having the number of cents in the associated bracket. Scale III is arcuate and consists of all the whole numbers from 0 through 9, each number being arranged in radial alignment with the bracket 38 with which it is associated. 0, which is the first number of scale III, is associated with the first bracket containing the numbers 00 through 02. The next number, 1 of scale III, is associated with the next bracket containing the numbers 03 through 07. Successive numbers of scale III are associated with successive brackets 38. All the brackets associated with scale III define a group of cents, 00 through 47, in scale II whose tax at the given tax rate is less than one dime. A window or opening 40 is provided in disc No. 4 alongside the first number 0 in scale III and between this number and its associated bracket 38 containing the numerals 00–02. This window is of proper size to read one number of a scale V, soon to be described, on disc No. 2.

Scale III' is similar to scale III, likewise consisting of all the whole numbers from 0 through 9. However, the 0 in scale III' is associated with the bracket containing the numerals 48 through 52, immediately following the bracket with which the last numeral, 9, of scale III is associated. All of the brackets associated with scale III' define a group of cents, 48–97, whose tax at the given tax rate is at least one dime and less than two dimes. Another window 42 is disposed between the first numeral, 0, of scale III' and the bracket with which it is associated, this window also being of proper size to read one number of a scale V' on disc No. 2.

Scale III'' consists only of the single numeral 0 and is associated with the last bracket 38 containing the numerals 98, 99. All of the brackets associated with scale III'' define a group of cents, 98–99, whose tax at the given tax rate is at least two dimes and less than three dimes. Scale III'' has a window 44 associated therewith which is of the proper size to read one number on a scale V'' on disc No. 2.

Disc No. 4 includes still another arcuate scale, IV, spaced radially inwardly from scales III, III', and III''. This scale, like scale II, reads in cents of a wage earned and covers all the whole numbers from 00 through 99 arranged at the same angular intervals as the numerals in scale I. The numbers of scale IV are used in computing the "victory" tax and they are grouped by brackets 46 on the same theory as scale II. However, since the tax rate for the "victory" tax is smaller, 3%, the groupings are larger and only the first and last number of each set need be printed. For example, the first set consists of the numbers from 00 through 16 and only these two numbers, therefore, are imprinted on disc No. 4, one adjacent each end of the bracket. The remaining sets into which the numbers of scale IV are separated are the set of numbers from 17 through 49, the set from 50 through 83 and the set from 84 through 99. Note that the tax of all of the cents in the first group at the given tax rate, 3%, is less than one cent, the tax of the cents in the second group at least one cent and less than two cents, the tax of the cents in the third group at least two cents and less than three cents, etc. Each of these sets of numbers is associated with a window 48, 50, 52 or 54, which is of such size that one number on an underlying scale VI, VI', VI'' or VI''' on disc No. 3 can be read therethrough.

Disc No. 2 carries three arcuate scales, V, V' and V'', which read in the ten-dollar, dollar, and dime digits of the "pay-as-you-go" tax. Scale V consists of a series of numbers, one for each of the numbers of scale I, that is, one hundred numbers having the same angular spacing as the numbers on scale I. These numbers start with .0 and include all the numbers having even tenths from .0 through 19.8. Said numbers are the tax to the largest whole dime of wages earned, less exemptions, at the given tax rate, 20%, when the wages are expressed in terms of dollars plus cents in the first large group of scale II, i. e. the group including 00–47 cents which is associated with scale III. The numbers on scale V are adapted to be read through the window 40 on disc No. 4.

Scale V' likewise consists of a series of one hundred numbers having the same angular spacing as the numbers on scale I. These numbers start from .1 and include all the numbers having odd tenths from .1 through 19.9. Said numbers are the tax to the largest whole dime of wages earned, less exemptions at the given tax rate, 20%, when the wages are expressed in terms of dollars plus cents in the group of scale II associated with group III', i. e. 48–97 cents. The numbers on scale V' are adapted to be read through the window 42 on disc No. 4.

Scale V" also consists of a series of one hundred numbers having the same angular spacing as the numbers on scale I. These numbers start from .2 and include all the numbers having even tenths from .2 through 20.0. Said numbers are the tax to the largest whole dime of wages earned less exemptions at the given tax rate, 20%, when the wages are expressed in terms of dollars plus cents in the group of scale II associated with group III", i. e. 98–99 cents. The numbers on scale V" are adapted to be read through the window 44 on disc No. 4.

It will be noted that the windows 40, 42 and 44 are disposed at different radial distances from the pivot 22 so as to enable the scales V, V' and V" to be radially spaced from each other where they overlap. Disc No. 3 carries four arcuate scales VI, VI', VI", and VI'" which read in the "victory" tax to the penny. Scale VI consists of a series of numbers, one for each of the numbers 12–62 of scale I, said numbers having the same angular spacing as the numbers of scale I. These numbers run from .00 through 1.50 in steps of .03 and are the tax, to the nearest penny, of wages earned, less the fixed exemption of $12.00, at the given tax rate, 3%, when the wages are expressed in terms of dollar plus cents in the first group of scale IV i. e. .00 through .16. The numbers on scale VI are adapted to be read through the window 48 on disc No. 4. Scales VI', VI", and VI'" are similar to scale VI except that the numbers of the successive groups are each a penny larger, that is, the first number of scale VI' is .01, the first number of scale VI" is .02, and the first number of scale VI'" is .03. However, the steps in all the groups are .03. The numbers in the successive groups are the taxes to the nearest penny, of the wage earned, less the said exemption of $12.00 at the 3% tax rate, when the wages are expressed in terms of dollars plus cents from the successive groups in which scale IV is divided by the brackets 46. Scale VI' is the tax for wages including the cents in the group of scale IV defined by the second bracket, scale VI" the tax for the wages including the cents in the third bracket of scale IV, etc. The numbers on scales VI', VI", and VI'" are adapted to be read through the windows 50, 52, and 54 respectively. Successive windows are disposed at different radial distances from the pivot 22 to radially space the scales VI, VI', VI", and VI'" where they overlap. Disc No. 2 also carries a scale VII which consists of a series of markers, such as pointers, 56 each of which has closely associated therewith a characterizing symbol 58, such as one of the letters of the alphabet. Scale VII is disposed immediately adjacent the periphery of disc No. 2 and is exposed to view through cut-out portion 24 of disc No. 4. This scale is read in conjunction with an indicator such as the arrow 60 on the rim of disc No. 1. Scale VII is used for setting exemptions into the calculator and the spacing between successive pointers 56 is therefore a function of a common factor (preferably the largest common factor) of the various possible exemptions. In the Tax Payment Act of 1943, the least exemption, other than no exemption at all, is $6.00 and the exemptions ascend at a rate of $6.00. Accordingly the angular spacing between successive pointers 56 is equal to the spacing between six successive numbers in scale I.

In accordance with the said Tax Payment Act, the withholding tax is 20% of the weekly wage earned in excess of an exemption which depends upon the family status of a wage earner. This deduction is zero if the wage earner is married and claims nothing of the joint exemption, $12.00 if the wage earner is single or is married and claims one-half of the joint exemption, and $24.00 if the wage earner is married or is the head of a family. Beyond these a wage earner is entitled to an additional exemption of $6.00 for each dependent other than his first dependent.

Further in accordance with the provisions of the same Act, the withholding tax must be at least 3% of the wage earned over $12.00 for each wage earner regardless of his family status or number of dependents. All of these provisions may be reduced to the following formulae:

$$T = \text{the greater of } R(W-KD) \text{ and } R'(W-E)$$

where T is the tax, R the higher tax rate, W the weekly wage earned, K a common factor of the various amounts of exemption, D an integer whose value depends upon the family status of a wage earner, R' the lower tax rate and E a fixed exemption. To satisfy these equations the various scales and means for reading the scales occupy the following relative positions:

When the pointer 36 is in radial alignment with the graduation 34 associated with the number 0, and the pointer 56 associated with the letter A is in radial alignment with the arrow 60, the number .0 of scale V is visible through the window 40, the number .1 of scale V' visible through the window 42 and the number .2 of scale V" visible through the window 44. Also, when the pointer 36 is in radial alignment with the graduation 34 associated with the number 12 of scale No. 1, regardless of the relative positions of the scale VII and the arrow 60, the number .00 of scale VI will be visible through window 48, the number .01 of the scale VI' visible through the window 50, the number .02 of the scale VI" visible through the window 52, and the number .03 of the scale VI'" visible through the window 54.

It should now be apparent that when discs Nos. 1, 2 and 3 are jointly rotated relative to disc No. 4, as each graduation 34 moves into alignment with the pointer 36 the last digit of the numbers appearing in each of the windows 40, 42 and 44 will increase by two, and the last digit in the numbers appearing in the windows 48—54 will increase by 3.

It will also be seen that if while the remaining discs are held stationary disc No. 2 is turned through an angular distance equal to the spacing between successive pointers 56 of scale VII the numbers visible through windows 40, 42 and 44 will vary by 1.2 and the numbers visible through windows 48—54 will not change at all.

Generally the mode of operation of the calculator is as follows, and disc No. 4 may also carry instructions 62 accordingly:

1. Holding disc No. 1, turn disc No. 2 until the pointer 56 associated with the correct letter of scale VII is radially aligned with the arrow 60. The correct letter of this scale is determined from inspection of a table of exemption letters such as is set forth below.

2. Turn disc No. 1, which will carry with it disc No. 2, until the graduation 34 associated with the correct largest whole number of dollars in the wage earned is radially aligned with the pointer 36, which for ease of location is placed between two heavy borders on disc No. 4.

3. Ascertain the number of pennies in the wage earned. Now the correct "pay-as-you-go" withholding tax is visible through the window 40, 42 or 44 alongside the bracket in which the number of pennies falls, or if the window is not there then in the next window above such bracket. The amount of the tax seen through the window is in ten-dollars, dollars and dimes. The penny figure of the tax appears by itself following the bracket in which the pennies of the wage earned lies.

4. If the wage earned is between $12.00 and $62.00, the correct "victory" tax is found in the window alongside of the bracket 46 containing the number of pennies in the wage earned. If the wage earned is less than $12.00 or more than $62.00, any figure appearing in these windows should be disregarded.

For wages over $100.00, the correct "pay-as-you-go" tax is found by determining the wage over multiples of one hundred dollars and adding $20.00 for each multiple of $100.00. It may also be done by finding the amount the wage exceeds a multiple of $50.00 and adding $10.00 for each such multiple.

The table of exemption letters is as follows:

If wage-earner is single and has—
This many dependents:     None  1  2  3  4  5  6  7  8
His exemption letter is         C  D  E  F  G  H  I  J  K
If wage-earner is married, claiming none of joint exemption, and has—
This many dependents: None  1  2  3  4  5  6  7  8  9  10
His exemption letter is   A  B  C  D  E  F  G  H  I  J  K
If wage-earner is married, claiming half of joint exemption, and has—
This many dependents     None  1  2  3  4  5  6  7  8
His exemption letter is        C  D  E  F  G  H  I  J  K
If wage-earner is married, claiming all of joint exemption, and has—
This many dependents:        None  1  2  3  4  5  6
His exemption letter is         E  F  G  H  I  J  K
If wage-earner is head of a family, and supports—
This many dependents:    1  2  3  4  5  6  7
His exemption letter is   E  F  G  H  I  J  K Three examples will now be given to illustrate the operation of the calculator:

Example 1

A wage earner has a weekly salary of $20.00. He is married, claims none of the joint exemption and claims no allowance for dependents. Accordingly, his exemption letter is A, so the pointer 56 associated therewith is radially aligned with the arrow 60 as shown in the drawings; then discs No. 1, 2 and 3 are jointly turned until the pointer 36 is radially aligned with the graduation 34 associated with the number 20 in scale I. His "pay-as-you-go" tax is $4.00, which appears in window 40. His "victory" tax would have been $.24, which appears in window 48. However, since the "pay-as-you-go" tax is larger, the "victory" tax may be disregarded.

Example 2

If the same man's salary had been $20.69 his "pay-as-you-go" tax would have been $4.14, the $4.10 being seen through the window 42 and the $.04 being alongside of the bracket 38 in which the $.69 falls. The corresponding "victory" tax would have been $.26, which appears in the window 52 alongside of the bracket 46 in which $.69 falls.

It should be noted that the second computation is performed without resetting the calculator.

Example 3

A man earns $154.27. He is married and widowed and has four young children. His exemption letter will be H, so the pointer 56 associated therewith is radially aligned with the arrow 60. Next discs No. 1, 2 and 3 are rotated to radially align the pointer 36 with the graduation 54 in scale No. 1. Dollars and dimes of the "pay-as-you-go" tax will now be found in the window 40. The amount is $2.40. The cents of the tax is found alongside the bracket containing $.27. This will be $.05 so that the "pay-as-you-go" tax will be $2.45. To this is added $20.00, which is the tax on $100.00. The total "pay-as-you-go" tax will thus be $22.45.

The calculator can also be employed to compute both the "pay-as-you-go" and "victory" taxes for wage earners having more dependents than are shown in the foregoing table of exemptions. The procedure for ascertaining taxes for such employees is based upon the following two tables:

*Table of exemptions greater than "K"*

If wage-earner is single and has—
This many dependents:  9  10  11  12  13  14  15  16  17  18  19  20  21  22  23
His exemption letter is  L  M  N  O  P  Q  R  S  T  U  V  W  X  Y  Z
If wage-earner is married, claiming none of joint exemption, and has—
This many dependents: 11  12  13  14  15  16  17  18  19  20  21  22  23  24  25
His exemption letter is  L  M  N  O  P  Q  R  S  T  U  V  W  X  Y  Z
If wage-earner is married, claiming half of joint exemption, and has—
This many dependents:  9  10  11  12  13  14  15  16  17  18  19  20  21  22  23
His exemption letter is  L  M  N  O  P  Q  R  S  T  U  V  W  X  Y  Z
If wage-earner is married, claiming all of joint exemption, and has—
This many dependents:  7  8  9  10  11  12  13  14  15  16  17  18  19  20  21
His exemption letter is  L  M  N  O  P  Q  R  S  T  U  V  W  X  Y  Z
If wage-earner is head of a family, and supports—
This many dependents:  8  9  10  11  12  13  14  15  16  17  18  19  20  21  22
His exemption letter is  L  M  N  O  P  Q  R  S  T  U  V  W  X  Y  Z

*Transposing table*

| | | | | | | | | | | | Col. I | Col. II |
|---|---|---|---|---|---|---|---|---|---|---|---|---|
| Basic letter: | | | | | | | | | | | | |
| Line I | A | B | C | D | E | F | G | H | I | J | K | $0.00 | $0.00 |
| Line II | | | | | | | L | M | N | | | 30.00 | .90 |
| Line III | | | | | O | P | Q | R | | | | 60.00 | 1.80 |
| Live IV | | | | S | T | U | V | | | | | 90.00 | 2.70 |
| Line V | | W | X | Y | Z | | | | | | | 120.00 | 3.00 |

To compute the withholding tax for a wage earner having an exemption letter over K, the arrow 60 is radially aligned with a pointer 56 associated with a basic letter in line I directly above the wage earner's actual exemption letter found in lines II–V. Next the even amount in column I at the line in which the actual exemption letter is found is subtracted from the actual wage to obtain what will be referred to hereinafter as a "calculation wage" and the pointer 36 is aligned with the graduation 34 corresponding to the dollars of this calculation wage. The amount which appears in the proper window 40–44 is the correct "pay-as-you-go" tax figure for the wage earner. However, the amount appearing in the proper window 48–54 is not the correct "victory" tax figure. Such correct tax is obtained, if the calculation wage is over $12.00, by reading off the "victory" tax appearing in the proper window 48—54 and adding thereto the figure in column II in the line containing the employee's actual exemption letter.

The following is an example of a computation for a wage earner whose exemption letter is greater than K and whose "pay-as-you-go" and "victory" tax will be found by employing the foregoing procedure:

EXAMPLE

A wage earner is the head of a family, has nine dependents and earns $80.55 a week. Referring to the second exemption table, it will be seen that his exemption letter is M. Referring to the transposition table, it will be seen that H is directly above M and that M is in line II. The arrow 60 is, therefore, radially aligned with the pointer 56 associated with H. The calculation wage is $50.55, obtained by subtracting $30.00, the amount found in column I at line II, from the actual wage. The pointer 36 is, therefore, radially aligned with the graduation 34 associated with the number 50 of scale I. The "pay-as-you-go" tax, found in window 42, is $1.70 plus $.01 from scale III', opposite the bracket containing the number 55 (the pennies of the wage) in scale II.

The "victory" tax for the calculated wage is $1.16, found in window 52 opposite the bracket 46 containing the number 55 in scale IV. To obtain the "victory" tax for the actual wage to $1.16 there is added $.90, which is the figure at column II in line II. Thus the correct "victory" tax is $2.06. Since this is larger than the "pay-as-you-go" tax it is the withholding tax figure to be used.

Occasionally the calculation wage will be less than $12.00 and will, therefore, show no "victory" tax figure. Since in such case there will probably be no "pay-as-you-go" tax, it is necessary to find the correct "victory" tax in order to obtain the requisite amount to be withheld. The "victory" tax in these instances is secured by computing a new calculation wage. This is done by subtracting from the actual wage the figure in column I for the line above that in which the wage earner's actual exemption letter appears and adding to the "victory" tax found for the new calculated wage the amount found in column II in that same line.

The following are three examples of the foregoing procedure:

EXAMPLE 1

A head of a family with nine dependents earns $33.00 a week. His actual exemption letter is M. The calculation wage is $3.00, obtained by subtracting $30.00, the figure in column I, line II, from $33.00, the actual wage. The basic letter is H which is directly above M. However, if the calculator is set for a wage of $3.00 and an exemption letter of H, neither a "pay-as-you-go" nor "victory" tax will be found. Note that the figures appearing in the two lower windows 52, 54 are not applicable, since the calculation wage is less than $12.00 and figures will appear in only these two windows, whereas figures should appear in all four windows if a tax is to be read from any one of the windows. Therefore, in accordance with the procedure above outlined, a new calculation wage is obtained by subtracting the figure in column I, line I immediately above the figure $30.00 just employed. This new figure is $0.00 so the calculator is set to $33.00 in scale I. To the "victory" tax which appears in window 40, to wit, $.63, there is added $0.00, the figure appearing in column II for that same line. Thus the correct "victory" tax is $.63 and this is the amount which should be withheld.

EXAMPLE 2

A married employee who claims the whole exemption and has fourteen dependents earns $101.25 a week. His actual exemption letter is S, which is found in line IV, the basic letter D being directly thereabove. His calculation wage is $101.25 less $90.00 in column I, line IV, or $11.25. When this figure is set into the calculator with an exemption letter of D, neither a "victory" tax nor a "pay-as-you-go" tax will be found. Therefore, with the calculator still set at D, a calculation wage of $41.25 should be set into the machine. This figure is obtained by subtracting from $101.25 $60.00, which is the figure in column I above $90.00. The $60.00, it will be noted, will be obtained from line III. The "victory" tax for this new calculation wage is $.88, to which there must be added $1.80, the figure in column II at line III, to obtain the correct "victory" withholding tax of $2.68.

EXAMPLE 3

The employee of Example 2 earns $75.00. However, $90.00 from column I, line IV cannot be subtracted from $75.00 to obtain a calculation wage so in lieu thereof $60.00, the figure in column I in line III next above is subtracted from $75.00 to obtain $15.00, which when set into the calculator will show a "victory" tax of $.09 in window 40. To this is added $1.80 from line III, column II to give the correct "victory" withholding tax of $1.89.

It will thus be seen that I have provided a device in which the several objects of this invention are achieved, and which is well adapted to meet all conditions of practical use.

It will be apparent from the foregoing description of the calculator and its operation that the same is capable of many alterations without departing from the spirit of the invention. Thus although the several discs have been described as being substantially circular in outline and their relative motion as rotary, straight slides having linear motion and relatively nested one within another could also be employed. Likewise, the base 12 could be omitted and disc No. 4 allowed to rotate. It will further be understood that the calculator may be arranged to handle the computation of taxes at tax rates and exemptions other than those cited above in connection with the Tax Payment Act of 1943, it only being necessary for this purpose to employ figures on the several scales consistent with the changed tax rates and variable exemptions and alter the spacing of the figures to account for variations in fixed exemptions.

As still other possible embodiments might be made of the above invention and other changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A tax calculator comprising several discs, means to interconnect said discs for relative rotary movement, one of the discs carrying a scale of wages earned, another disc carrying a scale of taxes at a given tax rate, one of said first two discs carrying a scale of exemptions and the other of said discs carrying means for cooperation with said scale of exemptions to relatively set said two discs, a scale of taxes at a different tax rate, said second tax scale being fixed for movement with the scale of wages, means on a top disc over said first two discs to set said top disc relative to the scale of wages, means on the top disc to read a tax on the first tax scale, and separate means on the top disc for simultaneously reading a tax on the second tax scale.

2. A tax calculator comprising three discs, means to interconnect said discs for relative rotary movement, a scale of wages earned on the first disc, a scale of taxes on the second disc, means on the third disc to set against a wage earned, means on the same disc to read the tax for such wage, a scale of exemptions on one of the first two discs, and means on the other of said pair of discs for cooperation with said scale of exemptions to relatively set said two discs, said scales, the figures thereof and the means for reading and setting against the same being in accordance with the formula $T=R(W-KD)$ where T is the amount of tax on the tax scale, R the tax rate, which is constant for the calculator, W the amount of wage on the wage scale, K a common factor of the amounts of exemption, which is constant for the calculator, and D a constant in the scale of exemptions which depends upon the family status of the wage earner.

3. A tax calculator comprising three discs, means to interconnect said discs for relative rotary movement, a scale on the first disc of wages earned in units larger than the smallest monetary unit, means on the third disc to be set against the number of such units in a wage earned, a plurality of scales of taxes on the second disc, one of which is for wages earned in terms of units of the first named scale and the remainder for wages in terms of the same units plus one or more smaller monetary units, a plurality of means on the third disc for reading taxes on the different tax scales whereby, without changing the setting of the first and third discs, a plurality of taxes for wages having the same number of larger units and different numbers of smaller units may be simultaneously computed, a scale of exemptions on one of the first two discs, and means on the other of said pair of discs for cooperation with said scale of exemptions to relatively set said two discs, said scales, the figures thereof and the means for reading and setting against the same being in accordance with the formula $T=R(W-KD)$ where T is the amount of tax on the tax scale, R the tax rate, which is constant for the calculator, W the amount of wage on the wage scale, K a common factor of the amounts of exemption, which is constant for the calculator, and D a constant in the scale of exemptions which depends upon the family status of the wage earner.

4. A tax calculator comprising two discs, means to interconnect said discs for relative rotary movement, a scale on the first disc of wages earned in units larger than the smallest monetary unit, means on the other disc to be set against the number of such units in a wage earned, a plurality of scales of taxes fixed for movement with the first disc, one of which is for wages in terms of units of the first named scale and the remainder for wages in terms of the same units plus one or more smaller monetary units, a plurality of means on the second disc for reading taxes on the different tax scales whereby, without changing the relative setting of such discs, a plurality of taxes for wages having the same number of larger units and different numbers of smaller units may be simultaneously computed, said scales, the figures thereof and the means for reading and setting against the same being in accordance with the formula $$T=R(W-E)$$

where T is the amount of tax on the tax scale, R the tax rate, which is constant for the calculator, W the amount of wage on the wage scale, and E a wage earner's exemption, which is constant for the calculator.

5. A tax calculator for computing taxes at a given tax rate on wages earned comprising two discs, means to interconnect said discs for relative rotary movement, a scale on the first disc of wages earned in monetary decimal units larger than the smallest monetary decimal unit, means on the second disc to be set against the number of such units in the wage earned, a scale on the second disc of monetary decimal units smaller than the units of the first named scale, the number of said smaller units equalling one of said larger units, the units of said second scale being divided into groups such that the tax on any number in the first group will be less than one monetary decimal unit smaller than the first scale unit, the tax on any number in the second group will be equal to or greater than said smaller monetary unit but less than two such units, etc., a plurality of scales of tax fixed for movement with the first disc, one of which is for wages earned in terms of units of the first named scale, the second of which is for wages earned in terms of the first enumerated unit plus any number in said second group, etc., a plurality of means on the second disc for reading the taxes on the different tax scales whereby, without changing the relative setting of the discs, a plurality of taxes for wages having the same number of larger monetary units and different numbers of smaller monetary units may be simultaneously computed, said scales, the figures thereof and the means for reading and setting against the same being in accordance with the formula $T=R(W-E)$, where T is the amount of tax on the tax scale, R the tax rate, which is constant for the calculator, W the amount of wage on the wage scale, and E the wage earner's exemption, which is constant for the calculator.

6. A tax calculator as set forth in claim 5 wherein the first enumerated monetary decimal unit is a dollar and the last enumerated monetary decimal unit is a dime.

7. A tax calculator as set forth in claim 5 wherein the first enumerated monetary decimal unit is a dollar and the last enumerated monetary decimal unit is a penny.

8. A tax calculator as set forth in claim 5 wherein the first enumerated monetary decimal unit is a dollar, the next enumerated monetary decimal unit a penny, and the last enumerated monetary decimal unit a dime.

9. A tax calculator for computing taxes at a given tax rate on wages earned comprising three discs, means to interconnect said discs for relative rotary movement, a scale on the first disc of wages earned in monetary decimal units larger than the smallest monetary decimal unit, means on a second disc to be set against the number of such units in the wage earned, a scale on the second disc of monetary decimal units smaller than the units of the first named scale, the number of said smaller units equalling one of said larger units, the units of said second scale being divided into groups such that the tax on any number in the first group will be less than one monetary decimal unit smaller than the first scale unit, the tax on any number in the second group will be equal to or greater than said last enumerated smaller monetary unit, but less than two such units, etc., a plurality of tax scales on the third disc one of which is for wages earned in terms of the first enumerated units plus any number in said first group, the second of which is for wages earned in terms of the first enumerated unit plus any number in said second group, etc., a scale of exemptions on one of the first and third discs and means on the other of the first and third discs for cooperating with said scale of exemptions to relatively set these two discs, a plurality of means on the second disc for reading the taxes on the different tax scales whereby, without changing the relative setting of the discs, a plurality of taxes for wages having the same number of the first enumerated monetary units and different numbers of the last named monetary units may be simultaneously computed, said scales, the figures thereof and the means for reading and setting against the same being in accordance with the formula $T=R(W-KD)$ where T is the amount of tax on the tax scales, R the tax rate, which is constant for the calculator, W the amount of wage on the wage scale, K a common factor of the amounts of exemption, which is constant for the calculator, and D a constant in the scale of exemptions which depends upon the family status of the wage earner.

10. A tax calculator as set forth in claim 9 wherein the first enumerated monetary decimal unit is a dollar and the last enumerated monetary decimal unit is a dime.

11. A tax calculator as set forth in claim 9 wherein the first enumerated monetary decimal unit is a dollar, the next enumerated monetary decimal unit is a penny, and the last enumerated monetary decimal unit is a dime.

12. A tax calculator as set forth in claim 9 wherein the first enumerated monetary decimal unit is a dollar, the next enumerated monetary decimal unit is a penny, and the last enumerated monetary decimal unit is a dime, and wherein the second disc is provided with another set of scales, one associated with each of the means for reading taxes, each of said last enumerated set of scales including numbers from 0 through 9 representing pennies, each group into which the units of the second scale is divided being further subdivided and each subdivision being associated with a different numeral of the last enumerated scale.

13. A tax calculator for computing taxes at a given tax rate on wages earned comprising three discs, means to interconnect said discs for relative rotary movement, a scale on the lower disc of wages earned in dollars, means on the top disc to be set against the number of dollars in the wage earned, a scale on the top disc of the pennies in the wage earned, said scale ranging from 0 through 99 pennies and being divided into main groups such that the tax on any number of pennies in the first main group will be less than a dime, the tax on any number of pennies in the second main group will be at least one dime but less than two dimes, etc., each of said groups being subdivided into further groups which are such that the tax on any number of pennies in the first subdivided group of the first main penny group is less than one cent, the tax on any number of pennies in the second subdivided group of the first main penny group is one penny, the tax on any number of pennies in the third subdivided group of the first main group is two pennies, the tax on any number of pennies in the first subdivided group of the second main penny group is one penny more than the tax on any number of pennies in the last subdivided group of the first main penny group, etc., a plurality of tax scales on the intermediate disc, one of which is for taxes for wages earned in dollars plus a number of pennies in the first main penny group, the second of which is for the wages earned in terms of dollars plus a number of pennies in the second main penny group, etc., the smallest unit of any number in the tax scales being a dime, a plurality of means on the top disc one associated with each main penny group for reading the tax on the different tax scales whereby, without changing the relative setting of the discs, a plurality of taxes for wages having the same number of dollars and different numbers of pennies may be simultaneously computed to the ten cent digit, another set of scales on the top disc one of which is associated with each main penny group and one numeral of each of which is associated with a different subdivided penny group, the last mentioned scales being in pennies from 0 through 9 and giving the penny digit of the tax in conjunction with the tax already computed to the ten cent digit, a scale of exemptions on the bottom disc or the intermediate disc and means on the other of said pair of discs for cooperation with said scale of exemptions to relatively set said two discs, said scales, the figures thereon and the means to read and set against the same being in accordance with the formula $T=R(W-KD)$ where T is the amount of tax on the tax scale, R the tax rate, which is constant for the calculator, W the amount of wage on the wage scale, K a common factor of the amounts of exemption, which is constant for the calculator, and D a constant in the scale of exemptions which depends upon the family status of the wage earner.

14. A tax calculator for computing taxes at a given tax rate on wages earned comprising a plurality of discs, means to interconnect said discs for relative rotary movement, a scale on the lower disc of wages earned in dollars, means on the top disc to be set against the number of dollars in the wage earned, a scale in pennies from 0 through 99 on the top disc which is divided into groups such that the tax on any number of pennies in the first group will be less than one penny, the tax on any number of pennies in the second group will be one penny, etc., a plurality of tax scales fixed relative to said lower scale, one of which is for taxes of the wages earned in dollars plus any number of pennies in the first penny group, the second of which is for taxes of the wages earned plus any number of pennies in the second penny group, etc., a plurality of means, one associated with each of the penny groups, on the top disc for reading taxes on the tax scales whereby, without changing the relative setting of the discs, a plurality of taxes for wages having the same number of dollars and different numbers of pennies may be simultaneously computed, said scales, the figures thereof and the means for reading and setting against the same being in accordance with the formula $T=R(W-E)$ where T is the amount of tax on the tax scale, R the tax rate, which is constant for the calculator, W the amount of wage on the wage scale, and E a wage earner's exemption, which is constant for the calculator.

JOHN N. M. HOWELLS.

REFERENCES CITED

The following references are of record in the file of this patent:

UNITED STATES PATENTS

| Number | Name | Date |
|---|---|---|
| 11,726 | Hatfield | Sept. 26, 1854 |
| 518,438 | Albert | Apr. 17, 1894 |
| 519,358 | Sweet | May 18, 1894 |
| 520,114 | Johnson | May 22, 1894 |
| 695,217 | Lauckton | Mar. 11, 1902 |
| 753,840 | Barth et al. | Mar. 8, 1904 |
| 1,129,033 | Baur | Feb. 16, 1915 |
| 1,210,488 | Kelly et al. | Jan. 2, 1917 |
| 1,881,165 | Becker | Oct. 4, 1932 |